US011930089B2

(12) United States Patent
Kothari et al.

(10) Patent No.: US 11,930,089 B2
(45) Date of Patent: *Mar. 12, 2024

(54) HIGHWAY DETECTION SYSTEM FOR GENERATING CUSTOMIZED NOTIFICATIONS

(71) Applicant: Allstate Solutions Private Limited, Bangalore (IN)

(72) Inventors: Rahul Kothari, Bangalore (IN); Payal Patel, Bangalore (IN); Anirudha S I, Bangalore (IN)

(73) Assignee: Allstate Solutions Private Limited, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,491

(22) Filed: Dec. 7, 2022

(65) Prior Publication Data

US 2023/0208934 A1  Jun. 29, 2023

Related U.S. Application Data

(63) Continuation of application No. 17/360,319, filed on Jun. 28, 2021, now Pat. No. 11,553,057, which is a
(Continued)

(30) Foreign Application Priority Data

Dec. 21, 2016  (IN) .............................. 201641043617

(51) Int. Cl.
*G06Q 30/00* (2023.01)
*G01C 21/36* (2006.01)
(Continued)

(52) U.S. Cl.
CPC .......... *H04L 67/55* (2022.05); *G01C 21/3679* (2013.01); *G01C 22/00* (2013.01);
(Continued)

(58) Field of Classification Search
CPC .......... H04L 67/55; H04L 67/52; H04W 4/38; H04W 4/029; H04W 4/40; G06F 16/9535;
(Continued)

(56) References Cited

U.S. PATENT DOCUMENTS 6,470,263 B2  10/2002  Ito et al.
6,862,524 B1  3/2005  Nagda et al.
(Continued)

FOREIGN PATENT DOCUMENTS

CN  103868516 A  6/2014
JP  2005114535 A  4/2005
(Continued)

OTHER PUBLICATIONS

"Accurate Vehicle Location System Using RFID, an Internet of Things Approach" by Jaco Prinsloo, et al from MDPI published Jun. 4, 2016.
(Continued)

*Primary Examiner* — Alvin L Brown
(74) *Attorney, Agent, or Firm* — Dinsmore & Shohl LLP

(57) ABSTRACT

A highway detection system may include a telematics device associated with a vehicle having one or more sensors arranged therein, a mobile device associated with a user traveling in the vehicle, and a server computer. The server computer may receive traveling data for a trip of the user from the one or more sensors and via the telematics device. The server computer may then determine whether the user is traveling within a city or on a highway based on analysis of the traveling data for the trip of the user, which may include a statistical analysis to calculate standard deviations of metrics in the traveling data. In response to the determination, the server computer may generate a notification to transmit to the user based on whether the user is traveling
(Continued)

within a city or on a highway and transmit the notification to the mobile device associated with the user.

20 Claims, 5 Drawing Sheets

Related U.S. Application Data continuation of application No. 15/501,449, filed as application No. PCT/IN2017/050049 on Feb. 2, 2017, now Pat. No. 11,082,511.

(51) Int. Cl.
| | | |
|---|---|---|
| G01C 22/00 | (2006.01) | |
| G01M 17/007 | (2006.01) | |
| G01P 11/00 | (2006.01) | |
| G06F 16/29 | (2019.01) | |
| G06F 16/9535 | (2019.01) | |
| G06F 16/9537 | (2019.01) | |
| G06Q 30/0251 | (2023.01) | |
| H04L 67/52 | (2022.01) | |
| H04L 67/55 | (2022.01) | |
| H04W 4/029 | (2018.01) | |
| H04W 4/38 | (2018.01) | |
| H04W 4/40 | (2018.01) | |
| G08B 21/18 | (2006.01) | |

(52) U.S. Cl.
CPC .......... *G01M 17/007* (2013.01); *G01P 11/00* (2013.01); *G06F 16/29* (2019.01); *G06F 16/9535* (2019.01); *G06F 16/9537* (2019.01); *G06Q 30/0261* (2013.01); *H04L 67/52* (2022.05); *H04W 4/029* (2018.02); *H04W 4/38* (2018.02); *H04W 4/40* (2018.02); *G08B 21/182* (2013.01)

(58) Field of Classification Search
CPC . G06F 16/9537; G06F 16/29; G01C 21/3679; G01C 22/00; G01M 17/007; G01P 11/00; G06Q 30/261; G08B 21/182
See application file for complete search history.

(56) References Cited

U.S. PATENT DOCUMENTS

| | | | |
|---|---|---|---|
| 7,421,334 B2 | 9/2008 | Dahlgren et al. | |
| 7,706,969 B2 | 4/2010 | Takagi et al. | |
| 8,165,775 B2 | 4/2012 | Nakamura | |
| 8,618,923 B2 | 12/2013 | Nakamura | |
| 8,750,853 B2 | 6/2014 | Abramson et al. | |
| 8,798,903 B2 | 8/2014 | Feng | |
| 8,892,126 B2 | 11/2014 | Busch | |
| 9,151,617 B2 | 10/2015 | Bouve | |
| 2008/0032703 A1 | 2/2008 | Krumm et al. | |
| 2008/0288406 A1 | 11/2008 | Seguin et al. | |
| 2009/0150314 A1* | 6/2009 | Engstrom | G05B 13/027 706/21 |
| 2010/0191551 A1 | 7/2010 | Drance et al. | |
| 2011/0106414 A1 | 5/2011 | Leanos et al. | |
| 2011/0106416 A1 | 5/2011 | Scofield et al. | |
| 2014/0122153 A1 | 5/2014 | Truitt | |
| 2014/0278574 A1 | 9/2014 | Barber | |
| 2014/0330505 A1 | 11/2014 | Wenneman et al. | |
| 2015/0032366 A1 | 1/2015 | Man et al. | |
| 2015/0120146 A1 | 4/2015 | Heo et al. | |
| 2015/0122018 A1 | 5/2015 | Yuen | |
| 2015/0203107 A1 | 7/2015 | Lippman | |
| 2015/0356869 A1 | 12/2015 | Young | |
| 2016/0007286 A1 | 1/2016 | Ismail et al. | |
| 2016/0018969 A1 | 1/2016 | Sundarraman et al. | |
| 2016/0040999 A1 | 2/2016 | Bouve | |
| 2016/0180839 A1 | 6/2016 | Tomita | |
| 2016/0216130 A1* | 7/2016 | Abramson | G01C 21/3423 |

FOREIGN PATENT DOCUMENTS

| | | | |
|---|---|---|---|
| JP | 2007182143 A | 7/2007 | |
| WO | 2015148695 A1 | 10/2015 | |

OTHER PUBLICATIONS

"iExit Interstate Exit Guide" by Metrocket, LLC updated Oct. 6, 2016, Version 9.1.2.

"Implementation of Location based Services in Android using GPS and Web Services" by Manay Singhal, et al. IJCSI International Journal of Computer Science Issues, vol. 9, Issue 1, No. 2, Jan. 2012.

Jun. 14, 2018—(WO) International Search Report & Written Opinion—PCT/IN17/50049.

TripAdvisor Hotels Flights Restaurants downloaded from AppCrawlr http://appcrawlr.com/ios/tripadvisor-hotels-flights-rest#authors-description downloaded Nov. 18, 2016.

Jun. 21, 2019 U.S. Non-Final Office Action—U.S. Appl. No. 15/501,449.

Jan. 27, 2020—U.S. Final Office Action—U.S. Appl. No. 15/501,449.

Jan. 31, 2020—(IN) Examination Report—Application No. 201641043617.

Jun. 19, 2020—U.S. Non-Final Office Action—U.S. Appl. No. 15/501,449.

Dec. 10, 2020—U.S. Final Office Action—U.S. Appl. No. 15/501,449.

Jun. 3, 2021—U.S. Notice of Allowance—U.S. Appl. No. 15/501,449.

* cited by examiner

HIGHWAY DETECTION SYSTEM FOR GENERATING CUSTOMIZED NOTIFICATIONS

CROSS-REFERENCE TO RELATED APPLICATIONS

This application is continuation U.S. patent application Ser. No. 17/360,319, filed Jun. 28, 2021, which is a continuation of U.S. patent application Ser. No. 15/501,449, filed Feb. 3, 2017, which is a U.S. National Stage application under 35 U.S.C. § 371 of International Application PCT/IN2017/050049, filed Feb. 2, 2017 which claims the benefit of priority from Indian Patent Application No. 201641043617, filed Dec. 21, 2016. Benefit of the filing date of each of these prior applications is hereby claimed. Each of these prior applications is hereby incorporated by reference in its entirety.

BACKGROUND

Mobile devices, such as smartphones, tablet computers, and other types of mobile computing devices, are becoming increasingly popular for a variety of purposes. In particular, mobile devices, such as smartphones, make people's lives easier by allowing them to connect with various applications and complete different tasks quickly. In some cases, users may utilize their mobile devices while driving in their vehicles to and from various destinations.

For example, a user may rely on a Global Positioning System (GPS) installed on his or her mobile device to navigate to and from destinations. In another example, the GPS may be running in the background of an operating system (OS) installed on a mobile device in order to provide location information and location services to other mobile applications installed on the mobile device. Unfortunately, obtaining location information based on GPS may be battery-intensive and may quickly deplete the battery of a user's mobile device. In other cases, a GPS signal from one or more satellites might not be available for providing location information in certain areas.

Without accessing location information on the user's mobile device, mobile applications might not be able to provide accurate and intuitive services that are customized to each user based on the user's location. Thus, it may be beneficial for mobile devices to obtain location information of a user while traveling in order to provide customized notifications to the user based on the user's location. As such, new systems, methods, and devices may be desired to leverage the capabilities of mobile devices in providing customized services to users in an improved and efficient manner.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspect of the disclosure provide effective, efficient, scalable, and convenient technical solutions that address and overcome the technical problems associated with obtaining location information and optimizing the efficient and effective technical operations of mobile devices and computer systems. In particular, one or more aspects of the disclosure describe computerized methods, systems, devices, and apparatuses for a highway detection system that may analyze a user's traveling data to determine whether the user is traveling within a city or traveling on a highway. In response to the determination, the highway detection system may generate customized and intuitive notifications that are transmitted to users as they are traveling.

The disclosure describes a system comprising a telematics device associated with a vehicle having one or more sensors arranged therein, a mobile device associated with a user traveling in the vehicle, and a server computer comprising hardware including a processor and memory. The server computer may be configured to receive, from the one or more sensors and via the telematics device, traveling data for a trip of the user, determine whether the user is traveling within a city (or rural road, other non-highway type road, or the like) or on a highway based on analysis of the traveling data for the trip of the user, in response to the determination, generate a notification to transmit to the user based on whether the user is traveling within a city or on a highway, and transmit the notification to the mobile device associated with the user.

In some embodiments, the traveling data may include at least one of a speed, an acceleration measurement, a braking measurement, a steering measurement, a distance measurement, a number of miles traveled for the trip, a trip duration, or a time of the trip. In some embodiments, analysis of the traveling data may include implementing a statistical analysis to identify values of at least one of means, medians, modes, ranges, variances, and standard deviations of metrics in the traveling data.

In some embodiments, in order to determine whether the user is traveling within a city or on a highway based on analysis of the traveling data, the server computer may determine a total amount of time for the trip of the user based on the traveling data, divide the total amount of time into a plurality of predetermined segments of time, calculate an average acceleration or average distance traveled for each predetermined segment of time, calculate a standard deviation of the average acceleration or average distance traveled for each predetermined segment of time, and determine whether the standard deviation of the average acceleration or average distance traveled for each predetermined segment of time is above a predetermined threshold value.

In some instances, in response to determining that the standard deviation of the average acceleration or average distance traveled for each predetermined segment of time is above the predetermined threshold value, the server computer may determine that the user is traveling within a city. In some instances, in response to determining that the standard deviation of the average acceleration or average distance traveled for each predetermined segment of time is below the predetermined threshold value, the server computer may determine that the user is traveling on a highway. In some instances, in response to determining that the user is traveling on a highway, the server computer may generate a notification comprising one or more locations of hotels, gas stations, repair shops, or service providers within a predetermined distance of the user's location In some embodiments, the server computer may further include a database configured to store data regarding the user's previous traveling history, in which the server computer may be further configured to access the data regarding the user's previous traveling history stored in the database, parse the data regarding the user's previous traveling history to identify an advertisement applicable to the user, and generate the notification comprising the advertisement applicable to the user.

In some embodiments, the one or more sensors may include at least one of an accelerometer, speedometer, and gyroscope, and the one or more sensors may be configured to collect the traveling data in or near real-time while the user is traveling. In some embodiments, the telematics device and the mobile device associated with the user traveling in the vehicle may be the same, and the user may be a passenger of the vehicle. In some embodiments, determining whether the user is traveling within a city or on a highway based on analysis of the traveling data for the trip of the user is performed without using global positioning system (GPS) data.

The disclosure also describes an apparatus comprising at least one processor, a network interface configured to communicate, via a network, with a telematics device and a mobile device associated with a user, and a memory storing computer-readable instructions that, when executed by the at least one processor, cause the apparatus to receive, from the telematics device, traveling data for a trip of the user traveling in a vehicle, determine whether the user is traveling within a city (or other non-highway area) or on a highway based on analysis of the traveling data for the trip of the user, in response to the determination, generate a notification to transmit to the user based on whether the user is traveling within a city or on a highway, and transmit the notification to the mobile device associated with the user.

In addition, aspects of this disclosure provide a method that includes receiving, from a telematics device associated with a vehicle having one or more sensors arranged therein, traveling data for a user traveling in the vehicle, determining, by one or more computing devices, whether the user is traveling within a city or on a highway based on analysis of the traveling data for the trip of the user, in response to the determination, generating, by the one or more computing devices, a notification to transmit to the user based on whether the user is traveling within a city or on a highway, and transmitting, by the one or more computing devices, the notification to a mobile device associated with the user.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited, by the accompanying figures in which like reference numerals indicate similar elements and in which.

DETAILED DESCRIPTION

Figure 1:
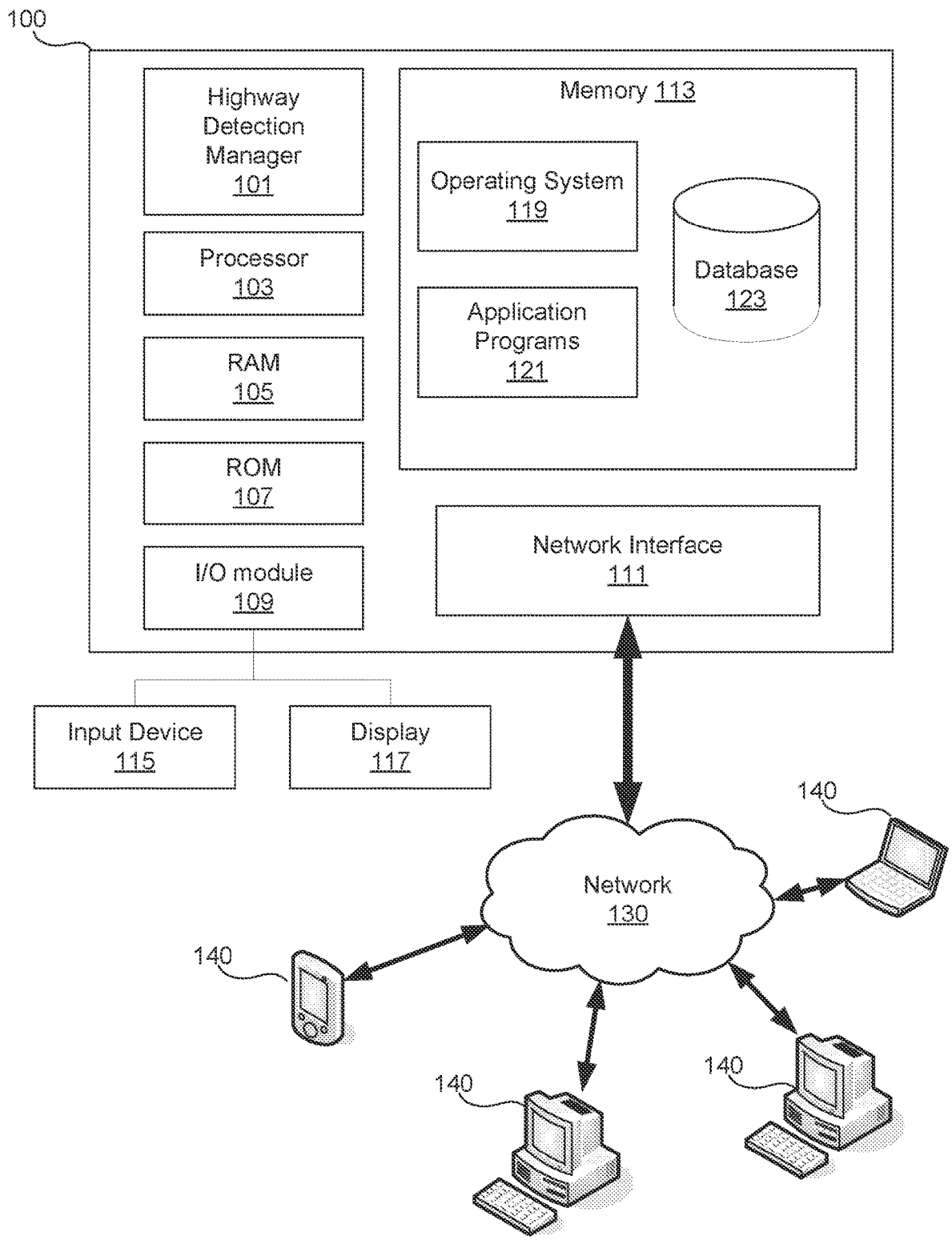
FIG. 1 depicts a block diagram of an example highway detection device that may be used in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

In accordance with various aspects of the disclosure, computerized methods, systems, devices, and apparatuses are disclosed that provide a highway detection system for determining whether users are traveling on highways or traveling within cities or other non-highway areas or roads based on analysis of collected traveling data. In particular, the highway detection system may collect traveling data for a trip of a user (e.g., any period of time in which the user is traveling in a vehicle). For example, the highway detection system may collect traveling data from a user's mobile device, in which the user may be a driver of a vehicle, a passenger of a vehicle, a passenger in any other form of transportation (e.g., bus, train, airplane, helicopter, watercraft, and the like). The highway detection system may then analyze the traveling data to determine whether the user is traveling in a city or on a highway, and generate customized notifications for the user based on the determination.

In some embodiments, the highway detection system may be referred to as a location detection system or a highway detection manager as described herein. In particular, the highway detection system may be integrated across a plurality of platforms and may be deployed by, for instance, an insurance provider that offers highway detection services or benefits to users (e.g., insurance policy holders). In other words, the insurance provider may offer highway detection services or benefits to users who are insurance policy holders with registered accounts, in which the users may have opted in for the highway detection service or program. In some cases, the insurance provider may offer limited highway detection services to users without registered accounts (e.g., non-customers) as a way of incentivizing the users to become insurance policy holders.

In some embodiments, the highway detection system may determine that the user is traveling by collecting data from the user's mobile device. For example, a mobile application may be installed on the mobile device in order to monitor any traveling data using one or more sensors of the mobile device. The traveling data may include data collected at or near real-time, such as any changes in position, velocity, and/or acceleration of a mobile device, as well as speeds, acceleration measurements, braking measurements, steering measurements, number of miles traveled, trip durations, trip times, and other measurements obtained while a user is traveling in a vehicle.

In yet additional embodiments, the highway detection system may determine that a user is traveling by collecting data from a telematics device associated with a vehicle. For example, a user may be a driver of a vehicle or a passenger of a vehicle. In some cases, there may be multiple travelers in a vehicle, including a driver and one or more passengers. The highway detection system may collect data from one or more vehicle sensors and/or by the vehicle's on-board diagnostic (OBD) system in order to analyze traveling data and determine where the user is traveling. In some cases, the highway detection system may collect traveling data from one of or both the user's mobile device and from the telematics device of a vehicle in which the user may be traveling. Additionally or alternatively, the insurance rating system may collect traveling data from another data source. In some examples, data collected from various sources may be aggregated to determine whether the user is traveling in a city or on a highway, or the like.

Based on the collected traveling data for a trip of the user, the highway detection system may analyze the traveling data and determine whether the user is traveling in a city or other non-highway area, or on a highway based on analysis of the traveling data for a trip of the user. In some embodiments, the highway detection system may perform a statistical analysis of the traveling data to identify values of at least one of means, medians, modes, ranges, variances, and standard deviations of metrics in the traveling data. For example, the highway detection system may obtain statistical data from the speeds, acceleration measurements, braking measurements, steering measurements, number of miles traveled, trip durations, trip times, and other measurements in the collected traveling data. Based on the statistical data, the highway detection system may determine whether the user is traveling in a city or other non-highway area, or on a highway.

In some embodiments, in order to analyze the traveling data, the highway detection system may determine a total amount of time traveled for a trip of the user based on the traveling data. For example, the highway detection system may determine that the user has been traveling for 20 minutes, 1 hour, 2 hours, or any other period of time. The highway detection system may further divide the total amount of time into a plurality of predetermined segments of time by using one or more algorithms. In some instances, the highway detection system may utilize a time-series analysis algorithm, a hidden Markov model algorithm, machine learning algorithms, or other statistics algorithms to identify how to segment the total amount of time. For example, the highway detection system may divide the total amount of time into 1 minute segments, 4 minute segments, 20 minute segments, or another other predetermined segments of time.

After segmenting the time, the highway detection system may calculate at least one of an average acceleration value or an average distance traveled value for each predetermined segment of time. In particular, the highway detection system may compute an average value by adding up each of the acceleration measurements or distance traveled measurements received for the predetermined segment of time, and then dividing by the number of acceleration measurements or by the number of distance measurements, respectively. The highway detection system may then compute a standard deviation value for each of the calculated average values. For example, if a user has traveled in a trip for a total of 30 minutes, then the highway detection system may divide the trip into 3-minute time segments and calculate the average acceleration or average distance traveled for each of the 3-minute time segments, along with a standard deviation for each average value calculated.

The highway detection system may further determine whether or not the standard deviation value of each average value for each predetermined segment of time is within a predetermined range or above a predetermined threshold. Based on this determination, the highway detection system may determine whether the user is traveling within a city or other non-highway area, or on a highway. For example, the standard deviation values for a user traveling on a highway may be lower than the standard deviation values for a user traveling in a city. That is, the user may be traveling at more consistent and steady speeds and/or accelerations on a highway than the speeds and/or accelerations at which the user travels at in a city or other non-highway. For example, traveling or driving in a city may be more congested than traveling or driving on a highway due to increased traffic, including cars, bicyclists, pedestrians, buses, and the like. In some cases, drivers may need to stop or slow down suddenly to brake for traffic or to stop at traffic lights or signals while traveling in a city.

In other cases, traveling or driving on a highway may be less congested since highways may typically accommodate for large volumes of traffic at high and/or consistent speeds. In some embodiments, a highway as described herein may be referred to as a multi-lane highway, a two-way highway, an interstate, a freeway, or the like, whereas a city as described herein may include an urban area with various streets in which space may be limited. For instance, a city may include roads in suburban areas, rural areas, townships, villages, and the like, and may include one or more traffic control devices, such as a stop sign, traffic signal, or the like. Additionally or alternatively, a highway may include roadways that have few or no traffic control devices. In some embodiments, users may also be able to travel distances more quickly and/or consistently on a highway than the distances traveled in a city. Thus, the highway detection system may utilize predetermined ranges and threshold values to assess standard deviation values accordingly and derive additional information about the user For example, if the user has traveled for 30 minutes and the highway detection system has computed the average speed of each 3 minute time segment to be ranging within 60-65 mph with a standard deviation of ±5-10 mph, then the highway detection system may determine that the user is traveling on a highway. In another example, if the user has traveled for 30 minutes, and the highway detection system has computed the average speed of each 3 minute time segment to range from 15-40 mph with a standard deviation of ±25-30 mph, then the highway detection system may determine that the user is traveling in a city. In another example, if the user has traveled for 2 hours and the highway detection system has computed the average distance traveled of each 10 minute time segment to range from 8-10 miles with a standard deviation of ±0.10 to 0.25 miles, then the highway detection system may determine that the user is traveling on a highway. In yet another example, if the user has traveled for 2 hours and the highway detection system has computed the average distance traveled of each 10 minute time segment to range from 1 mile to 5 miles with a standard deviation of ±0.5 to 3 miles, then the highway detection system may determine that the user is traveling in a city. In some embodiments, the highway detection system may continue to collect traveling data for additional periods of time (e.g., for an hour or more) to obtain more accurate and precise results of where the user is traveling (e.g., on a highway or non-highway area).

Ultimately, the highway detection system may determine that a user is traveling in a city (or other non-highway area or road) when the standard deviation is determined to be within a predetermined range or above a predetermined threshold value, and that the user is traveling on a highway when the standard deviation is determined not to be within a predetermined range or determined to be above a predetermined threshold value.

In response to determining whether the user is traveling in a city or on a highway, then the highway detection system may generate customized notifications that are specific to the user as described herein. For example, if the highway detection system determines that the user is traveling in a city, then the highway detection system may generate a notification to transmit to the user indicating that the user is traveling within a city, in which the notification may provide information regarding posted speed limits in the city or other information that may be applicable to the user while traveling within the city. In another example, if the highway detection system determines that the user is traveling on a highway, then the highway detection system may generate a notification to transmit to the user indicating that the user is traveling on a highway, in which the notification may provide information for booking a nearby hotel, directions to one or more hotels, restaurants, gas stations, repair shops, or service providers, and the like. In some cases, the notification may include information on one or more locations of interest for the user, in which the locations of interest are within a predetermined distance or radius of the user's location.

In additional embodiments, the highway detection system may be able to customize notifications to match a user's interests and previous traveling history. For example, the highway detection system may access and parse data regarding a user's previous traveling history and identify one or more advertisements applicable to the user based on the user's previous traveling history. The highway detection system may then generate a notification comprising at least one of the one or more advertisements applicable to the user. Ultimately, by detecting user locations through acceleration measurements and distance traveled measurements, rather than using a global positioning system which may rapidly consume battery power of a device, the highway detection system may enhance user experiences while traveling and provide customized notifications to travelers based on whether the user is traveling on a highway or in a city.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is also noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example highway detection device 100 that may be used in accordance with aspects of the present disclosure. The highway detection device 100 is a specialized computing device programmed and/or configured to perform and carry out aspects associated with providing highway detection features to users as described herein. The highway detection device 100 may have a highway detection manager 101 configured to perform methods and execute instructions as described herein. The highway detection manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the highway detection manager 101 may refer to the software (e.g., a computer program or application) and/or hardware used to receive traveling data for trips of users, analyze traveling data for each trip of each user, determine whether each user is traveling within a city (or other non-highway area or road) or on a highway based on analysis of traveling data (and, in some arrangements, without the use of GPS), generate notifications to transmit to each user based on the determination, and transmit each notification to each user.

Specifically, the highway detection manager 101 may be a part of a highway detection system that assesses traveling data using statistical analysis, determines averages and standard deviations for acceleration and/or distance traveled measurements, and generates customized notifications that are transmitted to each user's mobile device. The one or more specially configured processors of the highway detection manager 101 may operate in addition to or in conjunction with another general processor 103 of the highway detection device 100. In some embodiments, the highway detection manager 101 may be a software module executed by one or more general processors 103. Both the highway detection manager 101 and the general processor 103 may be capable of controlling operations of the highway detection device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or a driver associated with the highway detection device 100 may provide input data. The I/O module 109 may also be configured to be connected to a display device 117, such as a monitor, television, touchscreen, and the like, and may include a graphics card. The display device 117 and input device 115 are shown as separate elements from the highway detection device 100, however, they may be within the same structure.

Using the input device 115, system administrators may update various aspects of the highway detection system, such as rules, predetermined threshold values, predetermined ranges, and/or information related to identifying trip durations from traveling data for users, performing statistical analysis of metrics in traveling data, dividing trip durations into a plurality of predetermined segments of time, calculating average acceleration or average distance traveled values for each predetermined segment of time, calculating standard deviations of average acceleration or average distance traveled values for each predetermined segment of time, determining whether or not standard deviation values for each predetermined segment of time are within predetermined ranges or above/below predetermined threshold values, determining whether users are traveling in a city or on a highway based on standard deviation analysis, parsing data regarding users' previous traveling history, and generating customized notifications for users. On some highway detection devices 100, the input device 115 may be operated by users (e.g., passengers or drives each associated with at least one vehicle) to interact with the highway detection system, including receiving or submitting information regarding traveling information, receiving highway detection notifications, accessing one or more advertisements or information provided by the highway detection system (e.g., information on hotels, gas stations, restaurants, repair shops, service providers, or the like), providing or updating preferences for highway detection services, updating account information, and the like, as described herein.

The memory 113 may be any computer readable medium for storing computer executable instructions (e.g., software). The instructions stored within memory 113 may enable the highway detection device 100 to perform various functions. For example, memory 113 may store software used by the highway detection device 100, such as an operating system 119 and application programs 121, and may include an associated database 123.

The network interface 111 allows the highway detection device 100 to connect to and communicate with a network 130. The network 130 may be any type of network, including a local area network (LAN) and/or a wide area network (WAN), such as the Internet. Through the network 130, the highway detection device 100 may communicate with one or more computing devices 140, such as laptops, notebooks, smartphones, personal computers, servers, and the like. The computing devices 140 may include at least some of the same components as highway detection device 100. In some embodiments the highway detection device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a highway detection device 100. In other embodiments, the highway detection device 100 may include fewer or more elements. For example, the highway detection device 100 may use the general processor(s) 103 to perform functions of the highway detection manager 101, and thus, might not include a separate processor or hardware for the highway detection manager 101. Additionally, or alternatively, the highway detection device 100 may be a mobile device (e.g., a smartphone, tablet, and the like) specially configured to perform or carry out aspects of highway detection services described herein, and thus, may also include various other components, such as a battery, speaker, and/or antennas (not shown). Also, the highway detection device 100 may be a telematics device and/or a vehicle computing device (either installed by a vehicle manufacturer or as an aftermarket part) having vehicle compatible elements, such as a port for an on-board diagnostic connector or ports for other vehicle sensors (e.g., fuel level sensors, tire pressure sensors, engine temperature sensors, and the like). For example, the highway detection device 100 may be a vehicle's computer or a device plugged into the vehicle's computer for use in vehicle telematics.

Figure 2:
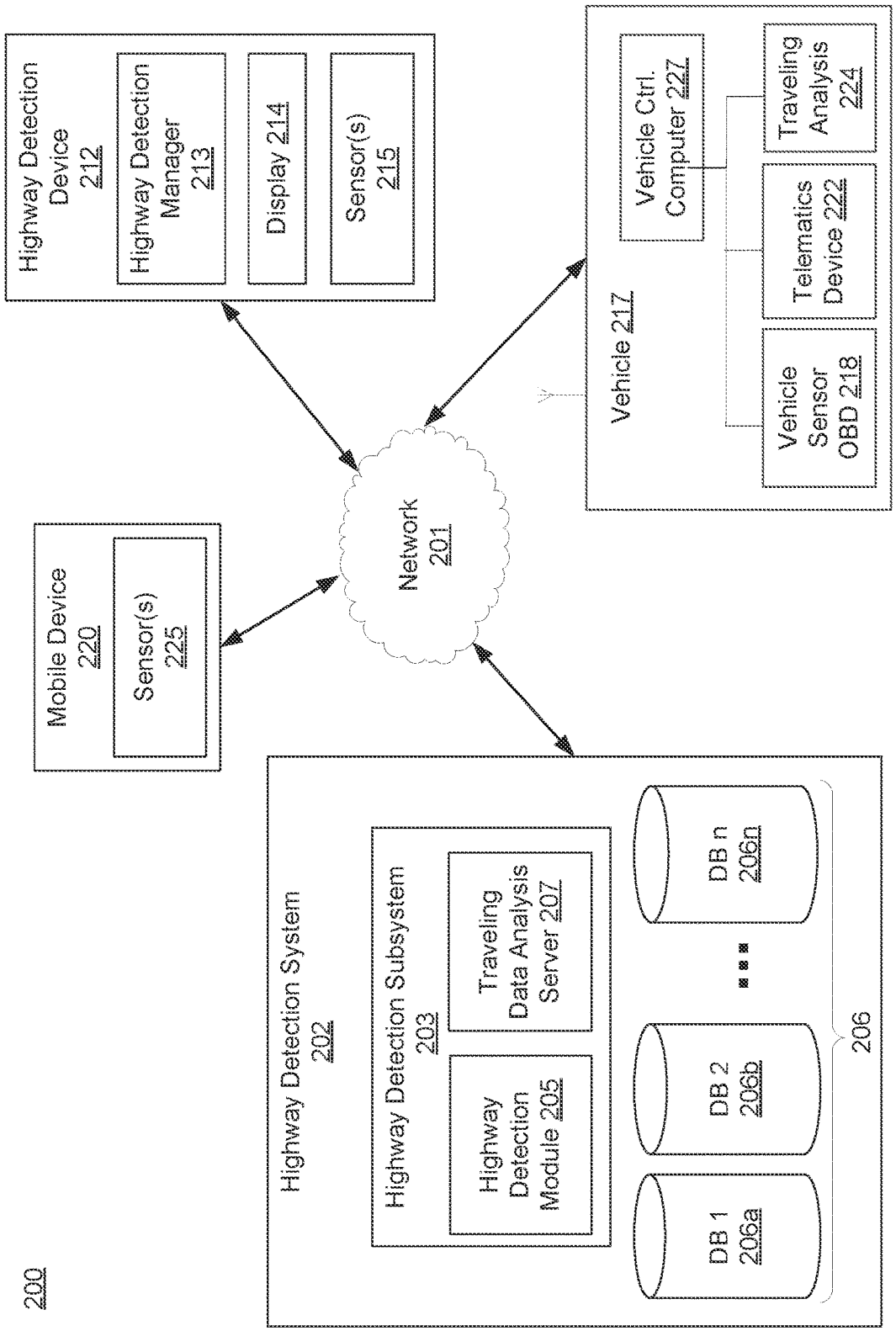
FIG. 2 depicts an example network environment in which various aspects of the present disclosure may be implemented in accordance with one or more example embodiments.

The computerized methods for providing highway detection features in order to enhance each user's traveling experience as disclosed herein may be implemented on one or more highway detection devices 100 used in various network environments. FIG. 2 illustrates an example network environment 200 for implementing methods in accordance with aspects of the present disclosure.

As shown in FIG. 2, the network environment 200 may include a network 201 configured to connect a highway detection system 202, highway detection device 212, vehicle 217, and mobile device 220. The highway detection device 212 may be the same as or at least similar to the highway detection device 100 described above with reference to FIG. 1. Collectively, these specialized computing devices may form at least a part of a highway detection system. Although only one of each of the components 212, 217, and 220 are shown in FIG. 2, it is understood that there may be any number of components 212, 217, and 220 in the network environment 200.

The network 201 may be any type of network, like the network 130 described above, and may use one or more communication protocols (e.g., protocols for the Internet (IP), Bluetooth, cellular communications, satellite communications, and the like.) to connect computing devices and servers within the network environment 200 so they may send and receive communications between each other. In particular, the network 201 may include a cellular network and its components, such as cell towers. Accordingly, for example, a mobile device 220 (e.g., a smartphone, flip-phone, tablet, and the like) or a highway detection device 212 of a user associated with vehicle 217 may communicate, via a cellular backhaul of the network 201, with a highway detection system 202 to request to participate in highway detection services or features. For example, the mobile device 220 or highway detection device 212 may request for the highway detection system 202 to provide optimized highway detection services to a user based on analyzing the user's traveling data. In some cases, the request to provide highway detection services may be performed automatically by the mobile device 220 or the highway detection device 212 upon receiving traveling data from the vehicle 217.

For example, the mobile device 220 or highway detection device 212 may identify that a user is traveling (e.g., as a driver or a passenger) in the vehicle 217 to a certain destination (e.g., recognized based on receiving telematics data from the vehicle 217), and the mobile device 220 or highway detection device 212 may automatically collect traveling data for a trip of the user. In another example, the mobile device 220 or the highway detection device 212 of the driver of the vehicle 217 may communicate, via the cellular backhaul of the network 201, with the highway detection system 202 to receive and/or submit information regarding traveling information, receive highway detection notifications for vehicle 217, access one or more advertisements or information provided by the highway detection system, provide or update preferences for highway detection services, update account information, and the like, as described herein.

And in the opposite direction, the highway detection system 202 may communicate, via the cellular backhaul of the network 201, with the mobile device 220 or the highway detection device 212 to notify the user (e.g., passenger or driver of vehicle 217) of the mobile device 220 or highway detection device 212 of highway detection notifications, as well as information on customized offerings from the highway detection system, such as information on hotels, gas stations, restaurants, repair shops, service providers, or the like. The highway detection system 202 may also communicate, via the cellular backhaul of the network 201, with the mobile device 220 or the highway detection device 212 to receive updated traveling information and to transmit notifications to users at the mobile device 220 or the highway detection device 212. As shown in FIG. 2, it should be understood that the mobile device 220 or highway detection device 212 may connect to the network even if it is removed from the vehicle 217.

In an embodiment, there may be multiple vehicles 217 that are covered by an insurance policy of a user, wherein the user may be signed up for highway detection services for each of his or her vehicles 217. Although FIG. 2 illustrates only one vehicle 217, the highway detection system may be configured to communicate with multiple vehicles 217 simultaneously (e.g., at or around the same time), and the multiple vehicles 217 may be associated with multiple users. The highway detection system 202 may receive traveling data for trips of respective users traveling in multiple vehicles simultaneously, analyze traveling data for respective users simultaneously, determine whether each respective user is traveling within a city or on a highway simultaneously based on respective traveling data analysis, generate customized notifications to transmit to respective users simultaneously based on respective determinations, and transmit customized notifications to respective users simultaneously. The multiple vehicles 217 may be any type of vehicle, including a car, motorcycle, bicycle, scooter, drone (or other automated device), truck, bus, boat, plane, recreational vehicle, helicopter, and the like, wherein the multiple vehicles 217 may be the same or may vary.

In an embodiment, there may be one or more users (e.g., a driver and one or more passengers) associated with the vehicle 217. A user may be associated with the vehicle 217 if a user is an owner of the vehicle 217, if a user has access and/or permission to drive or operate the vehicle 217, or if the user is a passenger in the vehicle 217. Additionally or alternatively, a user may be associated with the vehicle 217 if the user is identified on an insurance policy that insures the vehicle 217. A user of the vehicle 217 may interact with and operate a highway detection device 212. In an embodiment, the highway detection device 212 may be a specialized mobile device (e.g., mobile phone), a tablet, laptop, personal computer, and the like configured to perform or carry out aspects associated with highway detection services as described herein. For example, the highway detection device 212 may be the same (e.g., integrated with, include substantially the same components and provide substantially the same functionality, or the like) as the mobile device 220 depicted in FIG. 2. The highway detection device 212 may belong to a user, driver, passenger, or customer of an insurance company who is enrolled in the highway detection program. In some cases, the highway detection device 212 may be at an insurance provider, and data may be transmitted between the user and the device 212. Although only one highway detection device 212 is illustrated in FIG. 2, there may be any number of highway detection devices 212, wherein each highway detection device 212 is associated with at least one user. The highway detection device 212 may further comprise a highway detection manager 213, a display 214, and sensors 215. In the case of a highway detection device 212 that is installed in or connected to a vehicle 217 (e.g., an on-board vehicle computing device), the user is considered to operate that highway detection device 212 by performing the installation or connection of that device in or at the vehicle 217. In some embodiments, the highway detection device 212 may be connected with a speaker system in the vehicle 217, so that the user may be able to hear audio from the highway detection device 212 through the speakers in the vehicle 217.

The highway detection device 212 may be configured to execute the highway detection manager 213 that presents a user interface (e.g., a graphical user interface for a website, application, software program, and the like) on the display 214. The display 214 may comprise a monitor, television, touchscreen, and the like. The user interface of the highway detection manager 213 may allow users to send and receive information regarding traveling information, receive customized highway detection notifications, access one or more advertisements or information provided by the highway detection system 202 (e.g., information on hotels, gas stations, restaurants, repair shops, service providers, or the like), provide or update preferences for highway detection services, update account information, and the like, as described herein.

The highway detection manager 213 may be a self-sufficient program or may be a module, plug-in, or add-on of another program, such as a program used to collect and/or evaluate traveling information representing actions of a vehicle 217, driving behavior data of a driver associated with a vehicle 217, and/or previous traveling history data of a user. The highway detection manager 213 may have access to traveling data that is collected by the sensors 215 of the highway detection device 212. The highway detection manager 213 may be configured in a similar manner as the highway detection manager 101 or configured to perform similar functions as those performed by the highway detection manager 101. The sensors 215 may comprise various sensors and/or modules that detect traveling data, environmental information, and/or other related factors of a user of a vehicle 217. For example, the sensors 215 may comprise an accelerometer, speedometer, gyroscope, camera (or other image sensor), audio sensor, pressure sensor, and the like. The highway detection manager 213 may also have access to vehicle information (e.g., a make, model, and/or year of a vehicle of a user), traveling data, and/or other information that is collected by the sensors 215 of the highway detection device 212. For example, the sensors 215 may include fuel level sensors, tire pressure sensors, car engine sensors, oxygen sensors, temperature sensors, water sensors, coolant sensors, position sensors, oil pressure gauges and the like. Each of these sensors 215 may be used to monitor various metrics of the vehicle 217 to ensure that the vehicle 217 is properly functioning under safe operating conditions.

In an embodiment, the highway detection manager 213 may be downloaded or otherwise installed onto the highway detection device 212 using known methods. Different devices may install different versions of the highway detection manager 213 depending on their platform. A user may launch the highway detection manager 213 by, for example, operating buttons or a touchscreen on the highway detection device 212 or by speech or a voice input. Additionally, or alternatively, the highway detection device 212 may be configured to execute a web browser (e.g., an application for accessing and navigating the Internet) to access a web page providing an interface for the highway detection system. In some embodiments, the highway detection device 212 may also be configured to collect information, such as traveling data. For example, the highway detection manager 213 or another program installed on the highway detection device 212 may instruct the highway detection device 212 to collect traveling data in or near real-time using the various sensors 215 and/or vehicle sensors 218 (e.g., accelerometer, speedometer, gyroscope, magnetometer, car engine sensors, oxygen sensors, temperature sensors, water sensors, coolant sensors, position sensors, oil pressure gauges, and the like).

Traveling data may include real-time data collected while the user is traveling, including at least one of a speed, an acceleration measurement, a braking measurement, a steering measurement, a turn signal measurement, a number of miles traveled for a trip, a trip duration, a time of a trip, or the like. In some cases, the highway detection manager 213 may analyze the traveling data and also determine driving behaviors based on the traveling data. For example, users who are driving may exhibit different driving behaviors, such as staying within or going above posted speed limits or engaging in or avoiding sudden braking or sharp turning events while driving vehicle 217. Different driving behaviors may affect how quickly (and/or how slowly) a user will reach a destination in his or her vehicle 217. This information may be used to detect the user's location and whether the user is driving or traveling on a highway or in a city (e.g., without the use of GPS).

In some embodiments, based on the collected traveling data, the highway detection manager 213 may perform statistical analysis of the traveling data as described herein to detect where (or in what type of area) the user is traveling (e.g., without the use of GPS). For example, the highway detection manager 213 may obtain statistical data from the speeds, acceleration measurements, braking measurements, steering measurements, number of miles traveled, trip durations, trip times, and other measurements in the collected traveling data. The highway detection manager 213 may then determine that the user is traveling within a city (or other non-highway area such as a suburban or rural area) or on a highway based on identifying statistical data with standard deviation values that are above or below a predetermined threshold value (e.g., within or out of a predetermined threshold range). In response to the determination, the highway detection manager 213 may generate a notification to transmit to the user based on whether the user is traveling within a city or on a highway. In some embodiments, the highway detection manager 213 may keep track of locations to which the user has previously traveled over a period of time (e.g., in the past two days, week, 30 days, two months, or another period of time) and maintain this information as traveling history data (which may be stored in a database 206). The highway detection manager 213 may also store data regarding advertisements or information in which the user has previously shown interest during previous travels.

Based on the user's preferences, the highway detection manager 213 may automatically detect where (or what type of area) the user is traveling (e.g., on a highway or in a city) as described herein and/or generate one or more customized notifications to provide the user with various options, such as booking a nearby hotel, obtaining directions to one or more hotels, restaurants, gas stations, repair shops, or service providers, contacting roadside services, contacting an insurance agent, or the like. The user associated with the vehicle 217 and associated with the highway detection device 212 may employ the highway detection manager 213 to send, receive, confirm, and/or access at least one of traveling data, insurance information, account information, and settings/preferences related to the vehicle 217.

As illustrated in FIG. 2, vehicle 217 also includes vehicle operation sensor 218 (similar to one or more sensors 215) capable of detecting and recording various conditions at the vehicle and operational parameters of the vehicle. For example, sensor 218 may detect and store data corresponding to the vehicle's location, time, travel time, speed and direction, rates of acceleration or braking, gas mileage, and specific instances of sudden acceleration, braking, swerving, and distance traveled. Sensor 218 also may detect and store data received from the vehicle's 217 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 218 may detect and store the external driving conditions, for example, external temperature, rain, snow, light levels, and sun position for driver visibility. For example, external cameras and proximity sensors 218 may detect other nearby vehicles, vehicle spacing, traffic levels, road conditions, traffic obstructions, animals, cyclists, pedestrians, and other conditions that may factor into a driving data/behavior analysis. Sensor 218 also may detect and store data relating to moving violations and the observance of traffic signals and signs by the vehicle 217. Additional sensors 218 may detect and store data relating to the maintenance of the vehicle 217, such as the engine status, oil level, engine coolant temperature, odometer reading, the level of fuel in the fuel tank, engine revolutions per minute (RPMs), software upgrades, and/or tire pressure.

Vehicle sensor 218 also may include cameras and/or proximity sensors capable of recording additional conditions inside or outside of the vehicle 217. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 218 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 217. Sensor 218 also may be configured to collect data relating to a driver's movements or the condition of a driver. For example, vehicle 217 may include sensors that monitor a driver's movements, such as the driver's eye position and/or head position, etc. Additional sensors 218 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 218 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 218 may determine when and how often the vehicle 217 stays in a single lane or strays into other lane. A Global Positioning System (GPS), locational sensors positioned inside the vehicle 217, and/or locational sensors or devices external to the vehicle 217 may be used to determine the route, speed, lane position, road-type (e.g. highway, entrance/exit ramp, residential area, etc.) and other vehicle position/location data. However, in some examples, determining whether the user is traveling on a highway or in a non-highway area may be performed with the use of GPS data.

For instance, while the vehicle sensors 218 in the vehicle may include a GPS, the highway detection system 202 might not utilize the GPS to obtain location information (or might not use any obtained GPS information in the determination of whether a vehicle is operating on a highway or a non-highway area). For example, the highway detection system 202 may be particularly beneficial in that the system may rely on other sensor information to identify a vehicle location, such as data obtained from an accelerometer, speedometer, gyroscope, and other vehicle sensors 218. The highway detection system 202 may collect this data from the vehicle sensors 218 and further analyze the data to determine whether the user is traveling on a highway or in a city without using or relying on GPS data, which can rapidly deplete battery power of a device from which the GPS data is being obtained.

The data collected by vehicle sensor 218 (e.g., traveling data) may be stored and/or analyzed within the vehicle 217, such as for example by a traveling analysis computer 224 integrated into the vehicle, and/or may be transmitted to one or more external devices. For example, as shown in FIG. 2, sensor data may be transmitted via a telematics device 222 to one or more remote computing devices, such as highway detection device 212, mobile device 220, highway detection system 202, and/or other remote devices.

As shown in FIG. 2, the data collected by vehicle sensor 218 may be transmitted to a highway detection system 202, highway detection device 212, mobile device 220, and/or additional external servers and devices via telematics device 222. Telematics device 222 may be one or more computing devices containing many or all of the hardware/software components as the highway detection manager 101 depicted in FIG. 1. The telematics device 222 may receive vehicle operation data and traveling data from vehicle sensor 218, and may transmit the data to one or more external computer systems (e.g., highway detection system 202, insurance system server of an insurance company, financial institution, or other entity) over a wireless transmission network. Telematics device 222 also may be configured to detect or determine additional types of data relating to real-time traveling/ driving and the condition of the vehicle 217. The telematics device 217 also may store the type of vehicle 217, for example, the make, model, trim (or sub-model), year, and/or engine specifications, as well as other information such as vehicle owner or driver information, insurance information, and financing information for the vehicle 217.

In some cases, the telematics device 222 may be a device that is plugged into the vehicle's 217 on-board diagnostic (OBD) system (e.g., plugged in through an OBD II connector) or otherwise installed in the vehicle 217 in order to collect data. In some arrangements, while the telematics device 222 may also include a GPS receiver for collecting GPS coordinates, the highway detection system 202 might not utilize the GPS coordinates for determining the location of vehicle 217 or for detecting whether the user is traveling in vehicle 217 on a highway or in a city. Instead, the highway detection system 202 may rely on other sensor information to identify a vehicle location, such as data obtained from an accelerometer, speedometer, gyroscope, and other vehicle sensors 218.

In the example shown in FIG. 2, the telematics device 222 may receive traveling data for vehicle 217 from vehicle sensor 218, and may transmit the data to a highway detection system 202. As mentioned above, this traveling data may include data indicative of one or more vehicle metrics or vehicle telematics data for a vehicle in which a user is traveling, such as based on a driver's speed, acceleration, braking, steering, turn signals, and the like. In other examples, one or more of the vehicle sensors 218 or systems may be configured to receive and transmit data directly from or to a highway detection system 202 without using a telematics device. For instance, telematics device 222 may be configured to receive and transmit data from certain vehicle sensors 218 or systems, while other sensors or systems may be configured to directly receive and/or transmit data to a highway detection system 202 without using the telematics device 222. Thus, telematics device 222 may be optional in certain embodiments.

In some embodiments, telematics device 222 may be configured to execute a highway detection manager 213 that presents a user interface for a driver and/or user to provide inputs to and receive outputs from the highway detection system 202. The highway detection manager 213 may be downloaded or otherwise installed onto the telematics device 222 using known methods. Once installed onto the telematics device 222, a user may launch the highway detection manager 213 by, for example, operating buttons or a touchscreen on the dashboard of the vehicle 217 or by speech or a voice input. Additionally, or alternatively, the telematics device 222 may be configured to execute a web browser to access a web page providing an interface for the highway detection system 202.

FIG. 2 also illustrates a mobile device 220 which may be any mobile device associated with a user traveling in the vehicle 217. In particular, the mobile device 220 may belong to a user traveling in the vehicle 217, wherein the user is a customer of an insurance company and enrolled in a program that allows the user to participate in highway detection. Mobile device 220 may be, for example, a smartphone or other mobile phone, personal digital assistant (PDA), tablet computer, and the like, and may include some or all of the elements described above with respect to the highway detection manager 101. As shown in this example, some mobile devices (e.g., mobile device 220) may be configured to establish communication sessions with vehicle-based devices and various internal components of vehicle 217 via wireless networks or wired connections (e.g., for docked devices), whereby such mobile devices 220 may have secure access to internal vehicle sensors 218 and other vehicle-based systems.

However, in other examples, the mobile device 220 might not connect to vehicle-based computing devices and internal components, but may operate independently by communicating with vehicle 217 via their standard communication interfaces (e.g., telematics device 222, etc.), or might not connect at all to vehicle 217. In some cases, the mobile device 220 may be configured similarly to the highway detection device 212 and may interface or communicate with the telematics device 222 via a wired connection (e.g., USB, OBD II connector, and the like) or a wireless connection (e.g., Bluetooth). In some embodiments, both telematics device 222 and mobile device 220 (or a highway detection device 212) may be employed, whereas in another embodiment, only one of these devices may be used with the highway detection system to collect driving behavior data and vehicle locations. For example, a user associated with the vehicle 217 may choose whether he or she wishes to use his or her mobile phone to capture traveling data or whether he or she wishes to have a device plugged into the vehicle 217 to traveling data.

FIG. 2 also illustrates example subsystems within the network environment 200. That is, the highway detection system 202 may comprise a highway detection subsystem 203 and a plurality of databases 206. The highway detection subsystem 203 may include one or more application servers, computing devices, and other equipment (e.g., conference bridge equipment) used by company (e.g., insurance provider) personnel to implement and provide the highway detection described herein. For example, the highway detection subsystem 203 may include a highway detection module 205 that is configured with programmed instructions to receive traveling data for trips of users who are traveling from telematics device 222, from mobile device 220, and/or from highway detection device 212, analyze traveling data for each trip of each user, determine whether each user is traveling within a city or on a highway based on analysis of traveling data (e.g., without the use of GPS data), generate notifications to transmit to mobile devices 220 or highway detection devices 212 of each user based on the determination, and transmit each notification to mobile devices 220 or highway detection devices 212 of each user.

The highway detection subsystem 203 may further include one or more servers, such as a traveling data analysis server 207. The traveling data analysis server 207 may be configured with one or more rules and logics for analyzing traveling data received from telematics device 222, mobile device 220, and/or highway detection device 212. In some embodiments, the traveling data analysis server 207 may be configured with programmed instructions for performing statistical analysis of traveling data by applying statistical algorithms, machine learning algorithms, and other algorithms to the data. In some embodiments, the traveling data analysis server 207 may utilize predetermined threshold values and predetermined ranges for analysis of the traveling data and for determining whether users is traveling on a highway or in a city or other non-highway area. The traveling data analysis server 207 may access and utilize these predetermined threshold values for analysis of metrics in the traveling data, in which the predetermined threshold values and/or ranges may be stored in one or more databases (e.g., databases 206).

In some embodiments, the highway detection module 205 may detect whether the user is traveling on a highway or in a city (or other non-highway area) for various trips and store data regarding the previous traveling data as one or more records in a database (e.g., database 206) of the highway detection system 202, in which the one or more records may be associated with user or customer records stored in the database. For example, the one or more records may identify a unique identification number for a user or customer. In one example, a mobile device may be associated with the user through the use of a unique identification number (e.g., a phone number) for the user. In another example, the one or more records may include multiple fields for vehicle information, customer information, insurance ratings, including premium level, deductible level, amounts, and the like. Furthermore, the highway detection module 205 may also update or store information regarding vehicle information, traveling information, driving behaviors, traveling/driving history, user preferences, and the like in one or more databases 206. For example one or more databases 206 may store traveling data that is collected by sensors 215 of the highway detection device 215, sensors 225 of the mobile device 220, or by vehicle sensors 218.

The highway detection subsystem 203 may include functionality that may be distributed among a plurality of computing devices. For example, the highway detection subsystem 203 may comprise further subsystems, including client-side subsystems and server-side subsystems. The client-side subsystem may interface with the highway detection device 212, telematics device 222, and/or mobile device 220, whereas the server-side subsystem may interface with application servers and computing devices which handle a variety of tasks related to receiving traveling data for each trip of each user, analyzing traveling data for each trip of each user, determining whether each user is traveling within a city or on a highway based on analysis of traveling data (e.g., without the use of GPS data), generating customized notifications to transmit to each user based on the determination, and transmitting each customized notification to each user.

The subsystems, application servers, and computing devices of the highway detection subsystem 203 may also have access to the plurality of databases 206. In some embodiments, the plurality of databases 206 may be incorporated into the highway detection subsystem 203 or may be separate components in the highway detection subsystem 203. As an example, the plurality of databases 206 (e.g., databases 206a-206n) may comprise an accounts and billing database, a traveling information database, a driving behaviors database, a traveling history database, and other databases. One or more of the databases 206a-206n may comprise information regarding at least one of traveling data, driving behavior data, vehicle information, highway detection information, user preferences, and account and billing information. For example, databases 206a-206n may store one or more records of traveling history, such as previous locations to which the user has traveled, previous driving/traveling behaviors, driving/traveling patterns, and the like. The data stored in the plurality of databases 206 may be collected and compiled by the highway detection device 212, the telematics device 222, the highway detection subsystem 203, or by servers and subsystems within the highway detection subsystem 203.

Figure 3:
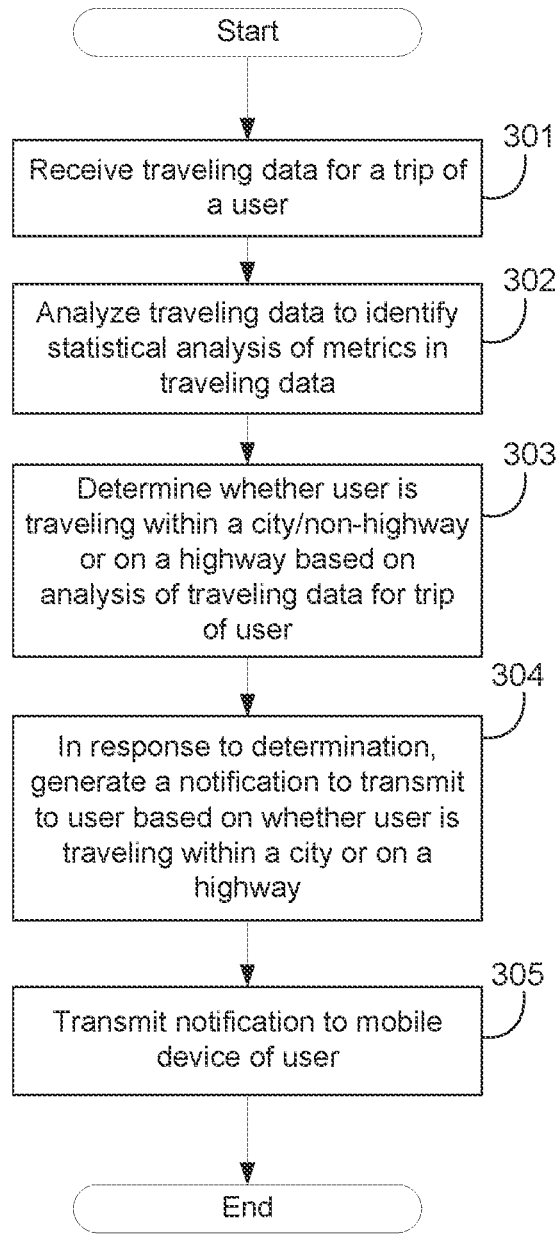
FIG. 3 depicts a flow diagram of example method steps in accordance with one or more example embodiments.

FIG. 3 illustrates a flow diagram of an example method in accordance with aspects of the present disclosure. In particular, FIG. 3 illustrates example method steps for receiving traveling data, determining whether a user is traveling in a city or on a highway based on analysis of the traveling data (e.g., without the use of GPS data), generating a notification to transmit to the user based on the determination, and transmitting the notification to a mobile device of the user. The steps of FIG. 3 may be performed by subsystems, application servers, and computing devices of the highway detection system 202 (e.g., highway detection subsystem 203, highway detection module 205, and/or traveling data analysis server 207). One or more of the steps of FIG. 3 may be performed by executing a highway detection program (e.g., a highway detection mobile application) and/or by operating a specially configured computing device of the highway detection system 202.

The method of FIG. 3 may begin with a step 301 of receiving traveling data for a trip of a user. For example, the highway detection system 202 may receive traveling data for a user traveling in the vehicle 217 for a trip. In some embodiments, a trip may indicate any period of time for which a user (e.g., a passenger or a driver) is traveling in the vehicle 217. In some embodiments, the traveling data of the vehicle 217 may be collected over a period of time (e.g., during a duration of a trip) by the telematics device 222, highway detection device 212, or mobile device 220. Traveling data may include data that is collected at or near real-time by vehicle sensors 218, sensors 215 of the highway detection device 215, or sensors 225 of the mobile device 220. In some embodiments, the traveling data may include at least one of a speed, an acceleration measurement, a braking measurement, a steering measurement, a number of miles traveled for a trip, a trip duration, a time of a trip, or the like.

At step 302, the highway detection system may analyze the traveling data to identify statistical analysis of metrics in the traveling data. For example, the highway detection system 202 may perform or implement a statistical analysis of the traveling data to identify values of at least one of means, medians, modes, ranges, variances, and standard deviations of metrics in the traveling data. In some embodiments, the highway detection system 202 may direct, control, and/or otherwise cause the traveling data analysis server 207 to analyze and obtain statistical data from the speeds, acceleration measurements, braking measurements, steering measurements, number of miles traveled, trip durations, trip times, and other measurements in the traveling data.

At step 303, the highway detection system may determine whether the user is traveling within a city (or other non-highway area) or on a highway based on the analysis of the traveling data. For example, the highway detection system 202 may determine that the user is traveling within a city based on identifying statistical data with standard deviation values that are above a predetermined threshold value or within a predetermined threshold range. In another example, the highway detection system 202 may determine that the user is traveling on a highway based on identifying statistical data with standard deviation values that are below a predetermined threshold value or not within a predetermined threshold range. In some embodiments, the highway detection system 202 may direct, control, and/or otherwise cause the highway detection module 205 to perform the determination of whether the user is traveling in a city or on a highway based on analysis of at least one of speeds, acceleration measurements, braking measurements, steering measurements, number of miles traveled, trip durations, trip times, and other measurements in the traveling data (e.g., without the use of GPS data).

At step 304, in response to the determination, the highway detection system may generate a notification to transmit to the user based on whether the user is traveling within a city or on a highway. For example, the highway detection system 202 may generate different notifications if the user is traveling within a city (or other non-highway area) versus if the user is traveling on a highway. In some embodiments, if the highway detection system 202 determines that the user is traveling in a city, then the highway detection system 202 may a generate a notification indicating that the user is driving within the city, in which the notification may provide information regarding posted speed limits in the city or other information that may be applicable to the user.

In other embodiments, if the highway detection system 202 determines that the user is traveling on a highway, then the highway detection system 202 may generate a notification indicating that the user is driving on a highway, in which the notification may provide information for booking a nearby hotel, directions to one or more hotels, restaurants, gas stations, repair shops, or service providers, and the like. For instance, the notification may include information on one or more locations of interest for the user, in which the locations of interest are within a predetermined distance or radius of the user's location.

At step 305, the highway detection system may transmit the generated notification to a mobile device of the user. For example, the highway detection system 202 may transmit the notification to the mobile device 220 of the user or to the highway detection device 212 of the user. In some embodiments, the notification may be displayed on a display of a computing device, such as display 214 of highway detection device 212, on a mobile device such as mobile device 220 in FIG. 2, on a vehicle display of an on-board vehicle computing device, or the like.

Figure 4:
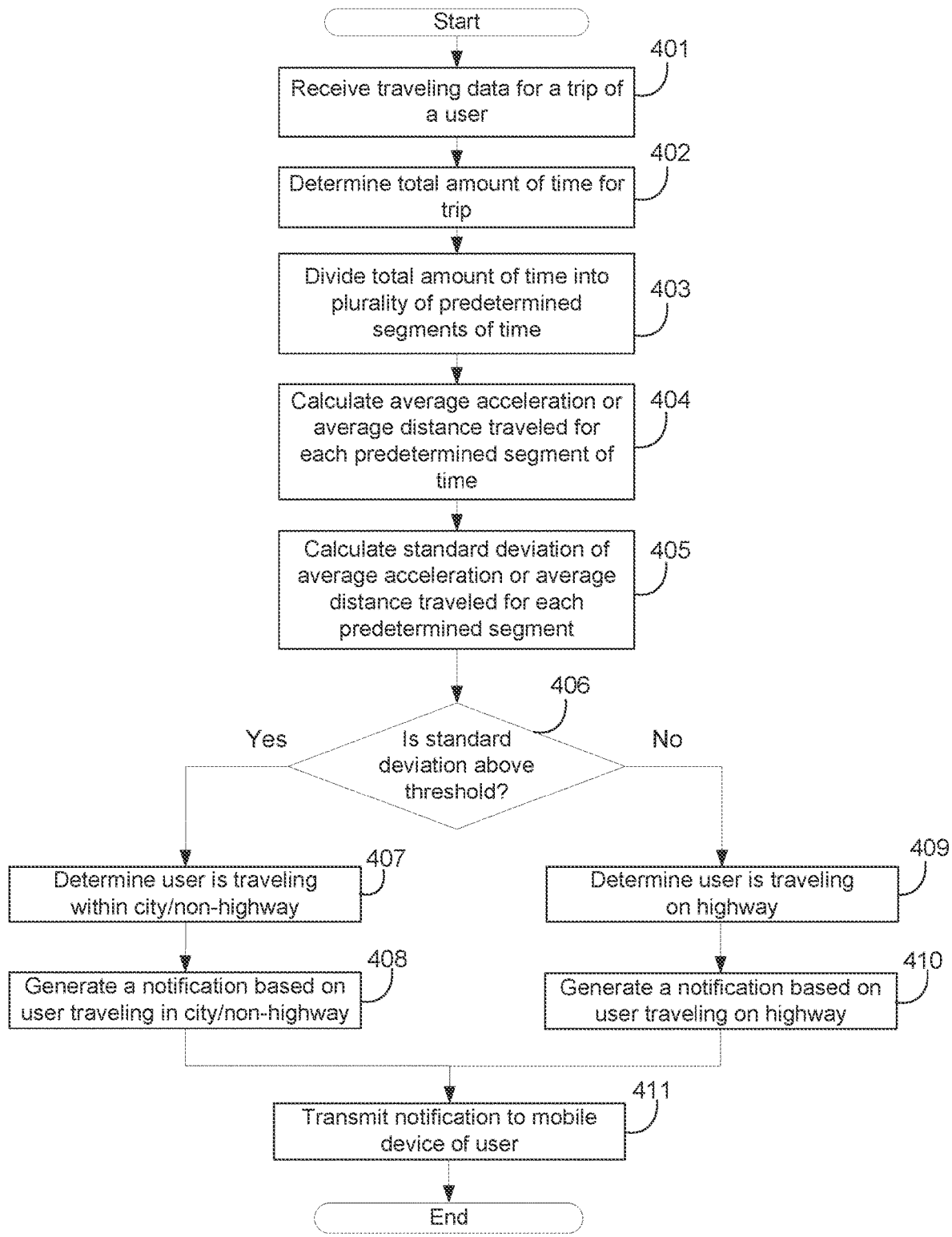
FIG. 4 depicts a flow diagram of example method steps in accordance with one or more example embodiments.

FIG. 4 illustrates a flow diagram of an example method in accordance with aspects of the present disclosure. In particular, FIG. 4 illustrates example method steps for receiving traveling data, determining an amount of time of a trip, segmenting the amount of time into predetermined segments, calculating averages for each predetermined segment, calculating standard deviations for averages for each predetermined segment, determining whether standard deviations are within a predetermined range, determining whether a user is traveling in a city (or other non-highway area) or on a highway based on the standard deviations (e.g., without the use of or relying on GPS data), generating a notification to transmit to the user based on the determination, and transmitting the notification to a mobile device of the user. The steps of FIG. 4 may be performed by subsystems, application servers, and computing devices of the highway detection system 202 (e.g., highway detection subsystem 203, highway detection module 205, and/or traveling data analysis server 207). One or more of the steps of FIG. 4 may be performed by executing a highway detection program (e.g., a highway detection mobile application) and/or by operating a specially configured computing device of the highway detection system 202.

The method of FIG. 4 may begin with a step 401 of receiving traveling data for a trip of a user. For example, the highway detection system 202 may receive traveling data for a user traveling in the vehicle 217 for a trip. In some embodiments, a trip may indicate any period of time for which a user (e.g., a passenger or a driver) is traveling in the vehicle 217. In some embodiments, the traveling data of the vehicle 217 may be collected over a period of time (e.g., during a duration of a trip) by the telematics device 222, highway detection device 212, or mobile device 220. Traveling data may include data that is collected at or near real-time by vehicle sensors 218, sensors 215 of the highway detection device 215, or sensors 225 of the mobile device 220. In some embodiments, the traveling data may include at least one of a speed, an acceleration measurement, a braking measurement, a steering measurement, a number of miles traveled for a trip, a trip duration, or a time of a trip.

At step 402, the highway detection system may determine a total amount of time for the trip. For example, the highway detection system 202 may measure a total trip time for vehicle 217 based on identifying a start time (e.g., a time at which the engine of vehicle 217 is turned on and vehicle 217 starts moving) and an end time (e.g., a time at which the engine of vehicle 217 is turned off and vehicle 217 stops moving). In some embodiments, the highway detection system 202 may measure the total amount of time for the trip based on the difference between the start time and end time of a vehicle trip. For example, the highway detection system 202 may determine the total amount of time for the trip to be 10 minutes, 30 minutes, 1 hour, or any other period of time. At step 403, the highway detection system may divide the total amount of time for the trip into predetermined segments of time. For example, the highway detection system 202 may divide the total amount of time for the trip into a plurality of predetermined segments of time by using one or more algorithms configured to perform time segmentation. In some embodiments, the highway detection module 205 in the highway detection system 202 may utilize a time-series analysis algorithm, a hidden Markov model algorithm, machine learning algorithms, or other statistics algorithms. For instance, the highway detection module 205 may divide the total amount of time into 30 second time segments, 2 minute time segments, 5 minute time segments, 10 minute time segments, or any other predetermined segments of time.

At step 404, the highway detection system may calculate at least one of an average acceleration value or an average distance traveled value for each predetermined segment of time. For example, for each predetermined segment of time, the highway detection system 202 may compute an average acceleration value by adding each of the acceleration measurements received for over the predetermined segment of time, and then dividing by the number of acceleration measurements. In another example, the highway detection system 202 may compute an average distance traveled value by adding each of the distance traveled measurements received for over the predetermined segment of time, and then dividing by the number of distance measurements.

At step 405, the highway detection system may calculate a standard deviation value of at least the average acceleration value or the average distance traveled value for each predetermined segment of time. For example, the highway detection system 202 may compute the standard deviation for each average value using the following equation for standard deviation:

$$\sigma = \sqrt{\frac{1}{N}\sum_{i=1}^{N}(x_i - \mu)^2}$$

In the above equation, σ is the standard deviation value, μ is the mean or average value for acceleration or distance, N is the total number of measurements (e.g., number of acceleration measurements or number of distance traveled measurements), and $x_i$ represents each measurement value (e.g., each acceleration value or each distance traveled value). In some embodiments, the highway detection module 205 may utilize the above equation to calculate the standard deviation of the average acceleration value or the average distance traveled value for each predetermined segment of time in the plurality of predetermined segments of time.

At step 406, the highway detection system may determine whether or not the computed standard deviation values are above a predetermined threshold. For example, the highway detection system 202 may determine whether or not the computed standard deviation values for each of the predetermined segments of time are above a predetermined threshold value for standard deviation values. In some embodiments, the standard deviation values for a user traveling on a highway may be lower than the standard deviation values for a user traveling in a city. That is, the user may be traveling at more consistent and steady speeds and/or accelerations on a highway than the speeds and/or accelerations at which the user travels at in a city. Similarly, the user may travel distances more quickly and/or consistently on a highway than the distances traveled in a city. Thus, the highway detection system 202 may utilize predetermined threshold values and/or predetermined ranges and assess standard deviation values accordingly to derive additional information about the user.

If the standard deviation is above a predetermined threshold value, then the method in this example proceeds to step 407. At step 407, the highway detection system may determine that the user is traveling within a city (or other non-highway area) based on the standard deviation being above the predetermined threshold value. For example, the highway detection system 202 may direct, control, and/or otherwise cause the highway detection module 205 to perform the determination that the user is traveling within a city (or other non-highway area) based on the standard deviation values.

At step 408, the highway detection system may generate a notification based on the determination that the user is traveling in a city (or other non-highway area). For example, the highway detection system 202 may generate a notification to transmit to the user indicating that the user is traveling within a city, in which the notification may provide information regarding posted speed limits in the city or other information that may be applicable to the user while traveling within the city. From step 408, the method in this example proceeds to step 411, at which the highway detection system may transmit the generated notification to a mobile device of the user. For example, the highway detection system 202 may transmit the notification to the mobile device 220 of the user or to the highway detection device 212 of the user. In some embodiments, the notification may be displayed on a display of a computing device, such as display 214 of highway detection device 212, on a mobile device such as mobile device 220 in FIG. 2, on a vehicle display of an on-board vehicle computing device, or the like.

Referring to step 406, if the highway detection system determines that the standard deviation is not above the predetermined threshold value (e.g., below a predetermined threshold value), then the method in this example proceeds to step 409. At step 409, the highway detection system may determine that the user is traveling on a highway based on the standard deviation being below the predetermined threshold value threshold value threshold value (e.g., or based on the standard deviation not being within the predetermined range). For example, the highway detection system 202 may direct, control, and/or otherwise cause the highway detection module 205 to perform the determination that the user is traveling on a highway based on the standard deviation values.

At step 410, the highway detection system may generate a notification based on the determination that the user is traveling on a highway. For example, the highway detection system 202 may generate a notification to transmit to the user indicating that the user is traveling on a highway, in which the notification may provide information for booking a nearby hotel, directions to one or more hotels, restaurants, gas stations, repair shops, or service providers, and the like. In some cases, the notification may include information on one or more locations of interest for the user, in which the locations of interest are within a predetermined distance or radius of the user's location.

At step 411, the highway detection system may transmit the generated notification to a mobile device of the user. For example, the highway detection system 202 may transmit the notification to the mobile device 220 of the user or to the highway detection device 212 of the user. In some embodiments, the notification may be displayed on a display of a computing device, such as display 214 of highway detection device 212, on a mobile device such as mobile device 220 in FIG. 2, on a vehicle display of an on-board vehicle computing device, or the like.

Figure 5A:
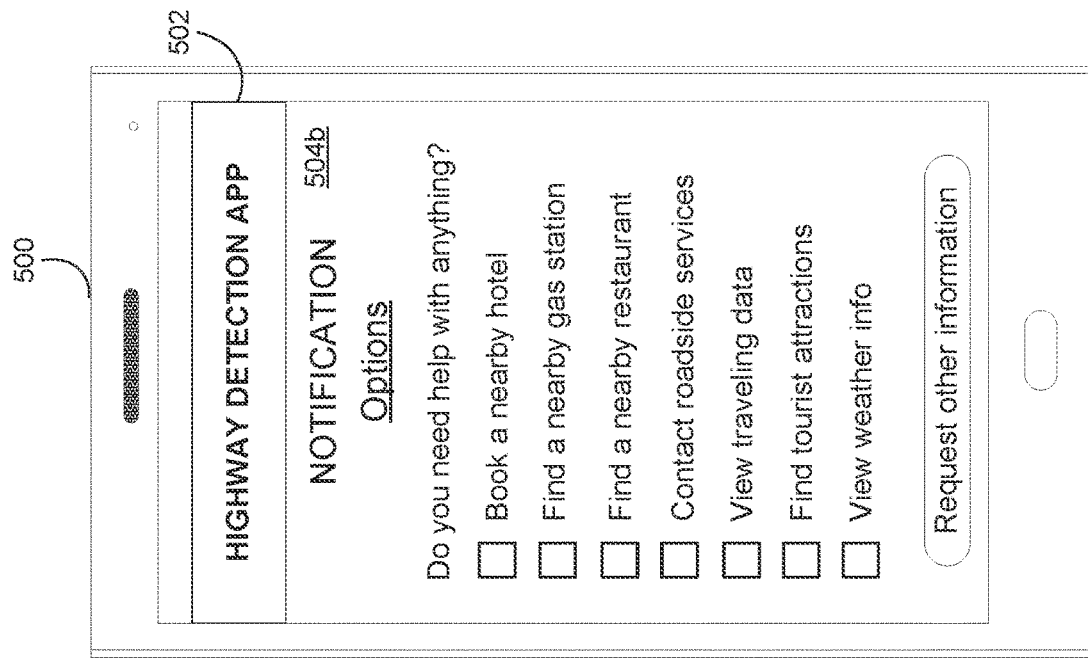
FIGS. 5A and 5B depict an illustrative diagram of example user interfaces of a highway detection application in accordance with one or more example embodiments.
Figure 5B:
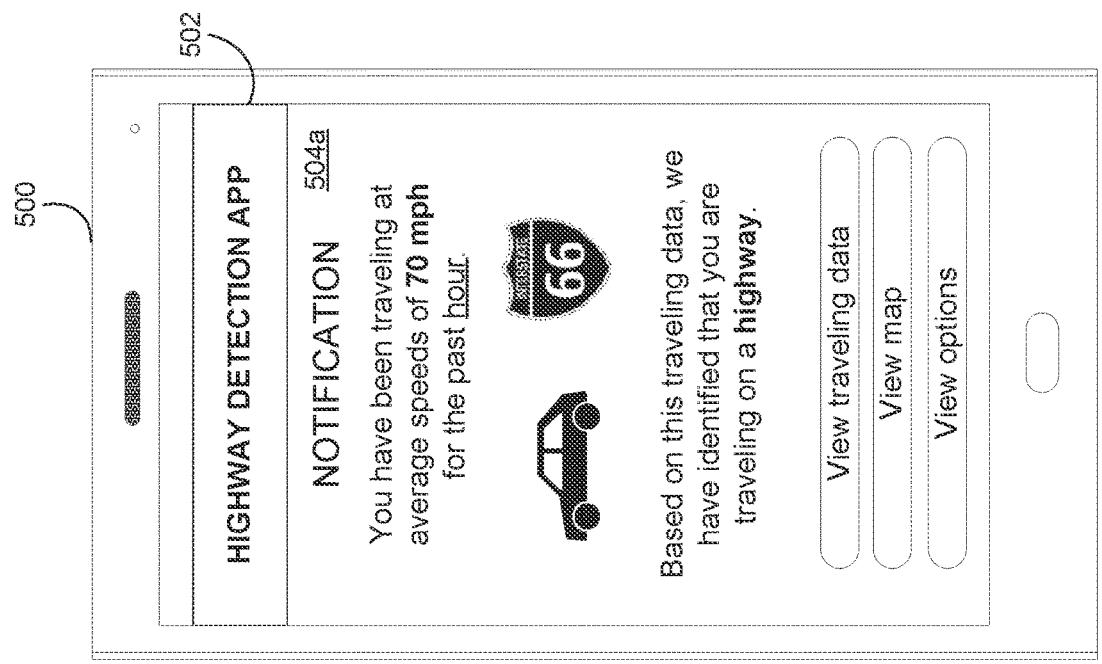

FIGS. 5A and 5B each depict an illustrative diagram of example user interfaces (e.g., user interfaces 504a and 504b) of a highway detection application 502 operating on a highway detection device 500 in accordance with aspects of the present disclosure. The example user interfaces 504a and 504b may be presented on a display of a computing device, such as display 214 of highway detection device 212, on a mobile device such as mobile device 220 in FIG. 2, on a vehicle display of an on-board vehicle computing device, or the like. A user (e.g., e.g., any user including a passenger of a vehicle or any mode of transportation or a driver operating a vehicle, such as vehicle 217) may access a highway detection application 502 using a highway detection device 500 (e.g., at least one of the highway detection device 212, telematics device 222, or mobile device 220). Specifically, FIGS. 5A and 5B illustrate example user interfaces of utilizing a highway detection application 502 to access, view, and manage highway detection services.

The user interface in FIG. 5A depicts an example of a notification that the highway detection application 502 may depict to a user (e.g., a passenger or driver of a vehicle) after detecting that the user is traveling on a highway. In some embodiments, the highway detection application 502 may display a notification that indicates that the user is traveling on a highway based on certain speeds detected by the highway detection system. From the user interface displayed in FIG. 5A, the user may be able to select various options, including "View traveling data," "View map", or "View options" (e.g., by tapping on a button or icon on the user interface depicted in FIG. 5A).

For example, the user may select "View traveling data" to navigate to a screen in the highway detection application 502 for more information on speeds, acceleration measurements, braking measurements, steering measurements, number of miles traveled, trip durations, trip times, and other real-time measurements in the traveling data collected by one or more sensors on the mobile device (e.g., mobile device 220) or vehicle sensors. In another example, the user may select "View map" to navigate to a screen in the highway detection application 502 that identifies the user's location and "View options" to navigate to a screen in the highway detection application 502 that provides more information on customized offerings from the highway detection system.

The user interface in FIG. 5B depicts an example of what the highway detection application 502 may present to a user after the user chooses the "View options" button depicted in the FIG. 5A user interface. In particular, the user interface in FIG. 5B depicts an example of options that the highway detection application 502 may present to a user after the highway detection system has determined that the user is traveling on a highway. The highway detection application 502 may provide the user with various options, such as booking a nearby hotel, obtaining directions to one or more hotels, restaurants, gas stations, repair shops, tourist attractions, or service providers, contacting roadside services, contacting an insurance agent, obtaining weather information, or the like. In some embodiments, the user interface in FIG. 5B may further provide additional information on one or more locations of interest for the user, in which the locations of interest are within a predetermined distance or radius of the user's location. By utilizing the highway detection application 502, users may request additional information regarding the highway detection services or traveling data, or also contact an insurance agent to discuss further regarding insurance options and insurance coverage while traveling.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

The invention claimed is:

1. A system comprising:
a telematics device associated with a vehicle having one or more sensors arranged therein;
a display for displaying an interactive a graphical user interface (GUI); and
a server computer, comprising hardware including a processor and memory, the server computer configured to:
receive, from the one or more sensors and via the telematics device, traveling data for a trip of a user;
determine whether the user is traveling within a city or on a highway based on analysis of the traveling data for the trip of the user;
generate a notification, wherein the notification is based on the determination of whether the user is traveling within a city or on a highway;
transmit the notification to the display; and
present on the interactive GUI the notification that is based on whether the user is traveling within a city or on a highway.

2. The system of claim 1, wherein the traveling data comprises at least one of a speed, an acceleration measurement, a braking measurement, a steering measurement, a distance measurement, a number of miles traveled for the trip, a trip duration, or a time of the trip.

3. The system of claim 1, wherein analysis of the traveling data comprises implementing a statistical analysis to identify values of at least one of means, medians, modes, ranges, variances, and standard deviations of metrics in the traveling data.

4. The system of claim 1, further comprising a database configured to store data regarding the user's previous traveling history, wherein the server computer is further configured to:
access the data regarding the user's previous traveling history stored in the database;
parse the data regarding the user's previous traveling history to identify an advertisement applicable to the user; and
generate the notification comprising the advertisement applicable to the user.

5. The system of claim 1, wherein the one or more sensors comprise at least one of an accelerometer, speedometer, and gyroscope, and wherein the one or more sensors are configured to collect the traveling data in or near real-time while the user is traveling.

6. The system of claim 1, wherein the user is a passenger of the vehicle.

7. The system of claim 1, wherein determining whether the user is traveling within a city or on a highway based on analysis of the traveling data for the trip of the user is performed without global positioning system (GPS) data.

8. The system of claim 1, wherein, based on a first user selection, the interactive GUI presents at least one of: a speed, an acceleration measurement, a braking measurement, a steering measurement, a distance measurement, a number of miles traveled for the trip, a trip duration, or a time of the trip; and further based on a second user selection, the interactive GUI presents a map that identifies a location of the user on the map.

9. The system of claim 1, wherein the analysis of the traveling data further comprises:
  determining a total amount of time for the trip of the user based on the traveling data;
  dividing the total amount of time into a plurality of predetermined segments of time;
  calculating an average acceleration or average distance traveled for each segment of the plurality of the predetermined segments of time;
  calculating a standard deviation of the average acceleration or average distance traveled for each segment of the plurality of the predetermined segments of time; and
  determining whether the standard deviation of the average acceleration or average distance traveled for each segment of the plurality of the predetermined segments of time is above a predetermined threshold value.

10. The system of claim 9, wherein the server computer is further configured to:
  in response to determining that the standard deviation of the average acceleration or average distance traveled for each predetermined segment of time is above the predetermined threshold value, determine that the user is traveling within a city.

11. The system of claim 9, wherein the server computer is further configured to:
  in response to determining that the standard deviation of the average acceleration or average distance traveled for each predetermined segment of time is below the predetermined threshold value, determine that the user is traveling on a highway.

12. The system of claim 11, wherein the server computer is further configured to:
  in response to determining that the user is traveling on a highway, generate a notification comprising one or more locations of hotels, gas stations, repair shops, or service providers within a predetermined distance of a location of the user.

13. An apparatus comprising:
  at least one processor;
  a network interface configured to communicate, via a network, with a telematics device and a display, the display comprising an interactive graphical user interface (GUI) presented on the display; and
  a memory storing computer-readable instructions that, when executed by the at least one processor, cause the apparatus to:
  receive, from the telematics device, traveling data for a trip of the user traveling in a vehicle;
  determine whether the user is traveling within a city or on a highway based on analysis of the traveling data for the trip of the user
  generate a notification, wherein the notification is based on the determination of whether the user is traveling within a city or on a highway, wherein the notification comprises one or more of a selectable icon to view the traveling data, a selectable icon to view a map, or a selectable icon to view available options;
  transmit the notification to the display; and
  present on the interactive GUI the notification that is based on whether the user is traveling within a city or on a highway and the selectable icon to view traveling data, the selectable icon to view the map, and the selectable icon to view available options.

14. The apparatus of claim 13, wherein the traveling data comprises at least one of a speed, an acceleration measurement, a braking measurement, a steering measurement, a distance measurement, a number of miles traveled for the trip, a trip duration, or a time of the trip, and wherein analysis of the traveling data comprises implementing a statistical analysis to identify values of at least one of means, medians, modes, ranges, variances, and standard deviations of metrics in the traveling data.

15. The apparatus of claim 13, wherein, based on a first user selection of the selectable icon to view the traveling data, the interactive GUI presents at least one of a speed, an acceleration measurement, a braking measurement, a steering measurement, a distance measurement, a number of miles traveled for the trip, a trip duration, or a time of the trip; and further based on a second user selection of the selectable icon to view the map, the interactive GUI presents a map that identifies a location of the user on the map.

16. The apparatus of claim 13, wherein the analysis of the traveling data further comprises:
  determining a total amount of time for the trip of the user based on the traveling data;
  dividing the total amount of time into a plurality of predetermined segments of time;
  calculating an average acceleration or average distance traveled for each predetermined segment of time;
  calculating a standard deviation of the average acceleration or average distance traveled for each predetermined segment of time; and
  determining whether the standard deviation of the average acceleration or average distance traveled for each predetermined segment of time is above a predetermined threshold value.

17. The apparatus of claim 16, wherein the instructions, when executed by the at least one processor, further cause the apparatus to:
  in response to determining that the standard deviation of the average acceleration or average distance traveled for each predetermined segment of time is above the predetermined threshold value, determine that the user is traveling within a city.

18. The apparatus of claim 16, wherein the instructions, when executed by the at least one processor, further cause the apparatus to:
  in response to determining that the standard deviation of the average acceleration or average distance traveled for each predetermined segment of time is below the predetermined threshold value, determine that the user is traveling on a highway; and
  generate a notification comprising one or more locations of hotels, gas stations, repair shops, or service providers within a predetermined distance of a location of the user.

19. A method comprising:
  receiving, from a telematics device associated with a vehicle having one or more sensors arranged therein, traveling data for a user traveling in the vehicle;
  determining, by one or more computing devices, whether the user is traveling within a city or on a highway based on analysis of the traveling data for a trip of the user;

generating, by the one or more computing devices, a notification, wherein the notification is based on the determination of whether the user is traveling within a city or on a highway;

transmitting, by the one or more computing devices, the notification to a display, the display comprising an interactive graphical user interface (GUI) presented on a display; and presenting, by the one or more computing devices, on the interactive GUI the notification that is based on whether the user is traveling within a city or on a highway.

20. The method of claim 19, wherein, based on a first user selection, the interactive GUI presents at least one of: a speed, an acceleration measurement, a braking measurement, a steering measurement, a distance measurement, a number of miles traveled for the trip, a trip duration, or a time of the trip; and further based on a second user selection, the interactive GUI presents a map that identifies a location of the user on the map.

* * * * *